US008609767B2

(12) United States Patent
Huang et al.

(10) Patent No.: US 8,609,767 B2
(45) Date of Patent: Dec. 17, 2013

(54) THERMOSETTING RESINS WITH GELLED NANOMETER-SIZED RUBBER PARTICLES

(75) Inventors: Fan Huang, Beijing (CN); Jinliang Qiao, Beijing (CN); Yiqun Liu, Beijing (CN); Xiaohong Zhang, Beijing (CN); Jianming Gao, Beijing (CN); Zhihai Song, Beijing (CN)

(73) Assignees: China Petroleum and Chemical Corporation, Beijing (CN); Sinopec Beijing Research Institute of Chemical Industry, Beijing (CN)

( * ) Notice: Subject to any disclaimer, the term of this patent is extended or adjusted under 35 U.S.C. 154(b) by 0 days.

(21) Appl. No.: 10/266,976

(22) Filed: Oct. 8, 2002

(65) Prior Publication Data

US 2003/0088036 A1    May 8, 2003

(30) Foreign Application Priority Data

Oct. 12, 2001  (CN) .................. 01 1 36381

(51) Int. Cl.
*C08L 61/10* (2006.01)
*C08L 61/20* (2006.01)
*C08L 67/06* (2006.01)
*C08L 83/04* (2006.01)

(52) U.S. Cl.
USPC ........... 525/119; 525/105; 525/114; 525/139; 525/163; 525/170

(58) Field of Classification Search
USPC ....................................... 525/107
See application file for complete search history.

(56) References Cited

U.S. PATENT DOCUMENTS

| 3,689,310 | A | * | 9/1972 | Johnson et al. ............... 427/500 |
| 4,853,434 | A | * | 8/1989 | Block ......................... 525/100 |
| 4,962,165 | A | * | 10/1990 | Bortnick et al. ............... 525/479 |
| 5,132,349 | A | * | 7/1992 | Iimuro et al. ................. 524/265 |
| 6,423,760 | B1 | * | 7/2002 | Qiao et al. .................... 522/150 |
| 2002/0176046 | A1 | * | 11/2002 | Kitamura et al. ............. 349/153 |
| 2003/0105217 | A1 | * | 6/2003 | Zhang et al. .................. 524/588 |

FOREIGN PATENT DOCUMENTS

| JP | 08041171 A | * | 2/1996 | ............. C08G 59/24 |
| JP | 09121086 A | * | 5/1997 | ............... H05K 3/38 |

OTHER PUBLICATIONS

"Fracture Behavior of Rubber-Modified High-Performance Epoxies" by Sue et al., pp. 131-173.
"Shear ductility and toughenability study of highly cross-linked epoxy/polyethersulphone", by Kishi et al., Journal of Materials Science 32 (1997), pp. 761-771.

* cited by examiner

*Primary Examiner* — Robert Sellers
(74) *Attorney, Agent, or Firm* — Ohlandt Greeley Ruggiero & Perle L.L.P.

(57) ABSTRACT

Toughened thermosetting resins comprising thermosetting resins and rubber particles having an average particle size in the range of 20 to 500nm. The toughened resins are obtained by mixing a fully vulcanized powdery rubber having an average particle size in the range of 20 to 500nm with thermosetting resin prepolymers and then curing them. The toughened thermosetting resins comprise rubber phases having a small, uniform and stable particle size, which results in a very significant toughening effect, especially when crazes rapidly grow (as in a standard Izod impact test). The toughened thermosetting resins are excellent in impact resistance, strength, modulus and heat resistance, and when appropriately toughened, the thermosetting resins can be enhanced in terms of impact strength, glass transition temperature and heat distortion temperature. The toughened thermosetting resins are useful for many application areas and the method for preparing the same can be carried out in a simple and easy manner and is suitable for toughening various thermosetting resins.

5 Claims, 1 Drawing Sheet

THERMOSETTING RESINS WITH GELLED NANOMETER-SIZED RUBBER PARTICLES

TECHNICAL FIELD OF THE INVENTION

The present invention relates to toughened thermosetting resins and preparation of the same. More particularly, the present invention relates to thermosetting resins toughened with rubbers and preparation of the same.

BACKGROUND OF THE INVENTION

The two main systems of synthetic resins are thermosetting resins and thermoplastic resins. Thermosetting resins are normally in liquid state or are soluble or fusible at earlier stage of their manufacturing or processing, and after being subjected to a chemical change caused by heating, catalyzing or others (for example, ultraviolet lights, rays or the like), can be cross-linked to form insoluble and infusible resins having a tri-dimensional structure. Thermosetting resins include epoxy resins, unsaturated polyester resins, phenolic resins, amino resins, alkyd resins, silicone resins and the like. Among which, epoxy resins and unsaturated polyester resins are two representatives of three main thermosetting resins. Compared with thermoplastic resins, thermosetting resins have good heat resistance, high hardness and excellent electric performances and thus are widely employed for industrial and domestic purposes. However, thermosetting resins are inherently hard, but brittle, poorly crack-resistant and less tough after curing, which limit their applications in many areas. Therefore, many researches are focused on how to enhance toughness of thermosetting resins, so that they have more excellently balanced physical and mechanical properties.

There are mainly four methods for enhancing the toughness of thermosetting resins in the prior art: (1) a chemical modification method for enhancing the flexibility of the main chain; (2) a method for increasing the molecular weight of the polymerization monomer; (3) a method for decreasing the cross-linking density of thermosetting resins; (4) a method for adding toughening agents. Among which, the method for adding toughening agents is currently the most effective method for toughening thermosetting resins. Such a method was invented by Mc Garry and Willner in 1960s and they found that it was possible to substantially enhance the toughness of epoxy resins by mixing liquid carboxyl-terminated butadiene-acrylonitrile (CTBN) with epoxy resin prepolymers and then curing the resulting mixture under particular conditions. Recent tens of years, researches were focused on the effects of the molecular weight of CTBN, reactivity of the terminal groups, the content of nitrile, the interfacial adhesion between CTBN rubber and epoxy resin matrix, types and usage of curing agents, curing processes or the like on CTBN-toughened epoxy resins. In addition to toughening epoxy resins with CTBN, researches were made on toughening epoxy resins with other carboxyl-terminated rubbers (carboxyl-terminated polybutadiene (CTB), carboxyl-terminated styrene-butadiene rubber (CTBS), carboxyl-terminated polyether rubber (CTPE) or the like) and various hydroxy-terminated rubbers (liquid hydroxy-terminated nitrile rubber (HTBN), hydroxy-terminated polybutadiene (HTPB) or the like). See, for example, POLYMER TOUGHENING, Edit. CHARLES B. ARENDS, published by MARCEL DEKKER, Inc., p.131; Blending Modification of Polymers, Edits. WU Peixi and ZHANG Liucheng, published by China Light Industry Press, 1996, p.311; LI Ningsheng and SUN Zaijian, Science and Engineering of Polymer Materials, No. 5, p. 8-13(1987); YAN Hengmei, Applications of Engineering Plastics, No. 2, p.45-52(1989); Epoxy Resins, Edits. CHEN Ping and LIU Shengping, published by Chemical Industry Press, p.126-138(1999). Generally, when toughening thermosetting resins, the rubbers must meet the following conditions: (1) the rubber phases should well dissolved in the uncured resin system, and undergo phase separation during the cross-linking of the resins to form rubber microdomains dispersed in the resin matrix in a particular particle size. The controlling of phase separation will impose direct effects on the particle size of rubber phases. Therefore, when toughening thermosetting resins as in the prior art, there are a great restriction on the selection of rubber phases, a high requirement for the process control, and furthermore, a relatively complicated operation. (2) For producing a toughening effect to a certain extent, the rubbers must contain, in the molecular structures, reactive groups having reactivity with the resin matrix, in order to provide chemical bonds or a good compatibility between rubber phases and the matrix. (3) For producing a toughening effect to a certain extent, the rubbers are normally used in a relatively large amount, which will decreases heat resistance and strength of thermosetting resins. To sum up, there are four main problems when toughening thermosetting resins with liquid rubbers: (1) thermosetting resins normally have high heat distortion temperature and glass transition temperature and when toughening with rubbers having a low glass transition temperature, the toughened thermosetting resins normally have largely decreased heat distortion temperature and glass transition temperature, which results in a decrease in heat resistance of the articles and a decrease in strength of thermosetting resins. (2) The toughening effect on such thermosetting resins as unsaturated polyester resins or the like is not marked; (3) The rubbers have an unstable particle size, and the micromorphology of the toughened thermosetting resins is difficult to control, which result that the performances of the articles can not be easily reproduced. (4) When crazes rapidly grow (as in a standard Izod impact test), there will be no substantial toughening effect.

To overcome the above-mentioned disadvantages, many attempts are made and among which, the most effective one is a method for toughening epoxy resins with rubber particles having a core-shell structure. Such a method can enhance the toughness of epoxy resins, while the glass transition temperature of epoxy resins remains unchanged. However, such a toughening method fails to effectively solve the problem that when crazes rapidly grow (as in a standard Izod impact test), there will be no substantial toughening effect. Moreover, the fact that the glass transition temperature of resins remains unchanged does not demonstrate that the heat distortion temperature, i.e., the heat resistant temperature, does not decrease, thus such a method cannot impart epoxy resins with a relatively high heat distortion temperature.

Further, attempts were recently made on the modification of thermosetting resins with thermoplastic resins having a high heat resistance (for example, polyethersulfone (PES), polyetherimine resins (PEI), polyarylethersulfone (PSF) having terminal functional groups, or the like), in order to overcome the decrease in heat resistance of thermosetting resins caused by modification with rubbers. Although such systems contribute to the enhancement of heat resistance, the toughening effect is not desirable. See, for example, Blending Modification of Polymers, Edits. WU Peixi and ZHANG Liucheng, published by China Light Industry Press, 1996, p.311; H. KISHI, Y-B. SHI, J. HUANG, A. F. YEE, JOURNAL OF MATERRIALS SCIENCE 32(1997) 761-771.

Therefore, a bottleneck in the art is how to enhance the toughness of thermosetting resins while remaining their heat resistance.

SUMMARY OF THE INVENTION

In view of the above, the present inventors conducted extensive researches in the field of toughening thermosetting resins, and as a result of many experiments, it is found that an excellent toughening effect can be achieved by toughening thermosetting resins with fully vulcanized powdery rubbers, and further a method suitable for toughening all thermosetting resins is found. The present invention is completed on the basis of the above findings.

Therefore, a general object of the present invention is to provide toughened thermosetting resins and preparation of the same, said toughened resins comprising thermosetting resins and rubber particles dispersed therein.

A specific object of the present invention is to provide thermosetting resins toughened with fully vulcanized powdery rubbers. The toughened thermosetting resins are characterized in that (1) rubber particles are uniformly dispersed in thermosetting resin matrix in an average particle size of about 20 to 500 nm; (2) rubber particles have a fixed size, which remains unchanged even if the usage of the rubbers and the curing process are changed, and the toughened resins are stable in their performances; (3) there is a very significant toughening effect, especially when crazes rapidly grow (as in a standard Izod impact test); (4) the toughened thermosetting resins are excellent in impact resistance, strength, modulus and heat resistance, and when appropriately toughened, the thermosetting resins can be enhanced in terms of impact strength, glass transition temperature and heat distortion temperature.

Another specific object of the present invention is to provide a method for preparing thermosetting resins toughened with fully vulcanized powdery rubbers. The method for preparing such toughened resins can be carried out in a simple, easy and cost-effective manner compared to the prior art.

The present invention in its one aspect provides toughened thermosetting resins, comprising thermosetting resins and rubber particles having an average particle size in the range of 20 to 500 nm, a homogeneous structure and a gel content of 75 percent by weight or more, with the ratio of the total weight of rubber particles to the total weight of thermosetting resins being (0.5~95):100.

The present invention in its another aspect provides a method for preparing the toughened thermosetting resins according to the present invention, comprising uniformly mixing rubber particles having an average particle size in the range of 20 to 500 nm with thermosetting resin prepolymers, with the simultaneous addition of a curing assistant, and then curing the resulting mixture to obtain said toughened thermosetting resin, wherein the ratio of the total weight of rubber particles to the total weight of thermosetting resin prepolymers is (0.5~95):100.

These and other objects, features and advantages of the present invention will be apparent after reading the whole description in conjunction with the drawings.

BRIEF DESCRIPTION OF DRAWINGS

FIG. 1 is a transmission electron micrograph of the sample obtained in Example 1 (magnification 29,000). The scale indicated in this FIGURE stands for 500 nm, and the particulate shadow stands for rubber particles dispersed in thermosetting resin matrix in an average particle size of about 90 nm.

DETAILED DESCRIPTION OF THE PREFERRED EMBODIMENT

The toughened thermosetting resins according to the present invention comprise thermosetting resins and rubber particles having an average particle size of 20 to 500 nm, preferably 30 to 200 nm, more preferably 50 to 150 nm. The rubber particles are of a homogeneous structure and have a gel content of 75 percent by weight or more, preferably 85 percent by weight or more. The weight ratio of rubber particles to the resins is (0.5~95):100, preferably (1~45):100, more preferably (1~30):100.

In the toughened thermosetting resins according to the present invention, thermosetting resins as the continuous phase include epoxy resins, unsaturated polyester resins, phenolic resins, amino resins, alkyd resins, silicone resins or the like, preferably epoxy resins, unsaturated polyester resins or phenolic resins.

In the toughened thermosetting resins according to the present invention, rubber particles, as the dispersed phase, are preferably ones having a homogeneous structure and a gel content of 75 percent by weight or more. Such rubber particles can be fully vulcanized powdery rubbers prepared as described in International Application WO01/40356(corresponding to U.S. Pat. No. 6,423,760) filed by the present applicants on Sep. 18, 2000 and Chinese Patent Application No. 00109217.0 filed by the present applicants on Jun. 15, 2000, both of them are cited herein by way of reference. The fully vulcanized powdery rubbers are at least one selected from fully vulcanized powdery natural rubber, fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery polybutadiene rubber, fully vulcanized powdery chloroprene rubber, fully vulcanized powdery silicone rubber, fully vulcanized powdery acrylic rubber, fully vulcanized powdery butadiene-styrene-vinylpyridine rubber, fully vulcanized powdery isoprene rubber, fully vulcanized powdery butyl rubber, fully vulcanized powdery ethylene-propylene rubber, fully vulcanized powdery polysulfide rubber, fully vulcanized powdery acrylate-butadiene rubber, fully vulcanized powdery urethane rubber or fully vulcanized powdery fluorine rubber. Fully vulcanized powdery rubbers mean fine rubber powders which have a gel content of 60 percent by weight or more, preferably 75 percent by weight or more and are freely flowing after drying without any partitioning agents. Such powdery rubbers are obtained by irradiating rubber latexes to cross-link them and fix the particle size of rubber particles.

The toughened thermosetting resins according to the present invention are prepared by uniformly mixing the rubber particles having an average particle size of 20 to 500 nm with thermosetting resin prepolymers, with the simultaneous addition of a curing assistant or other conventional assistants, and then curing the resulting mixture to obtain said toughened thermosetting resins. The rubber particles and thermosetting resin prepolymers are mixed with each other by either of the following two methods: a). a one-step method, i.e., directly mixing said rubber particles and said thermosetting resin prepolymers in a desired ratio; b). a two-step method, i.e., premixing said rubber particles with a part of said thermosetting resin prepolymers in a weight ratio of (1~100):100 to form a masterbatch, and then mixing said masterbatch with the remainder of said thermosetting resin prepolymers. The masterbatch preferably comprises rubber particles and thermosetting resin prepolymers in a weight ratio of (5~50):100, more preferably (5~30):100. Whether the mixing is carried out in one step or two steps, the weight ratio of the total weight of rubber particles to the total weight of the thermosetting resin prepolymers in the mixture should be (0.5~95):100, preferably (1~45):100, more preferably (1~30):100. In the method according to the present invention, the curing assistant is those conventionally employed in the field of thermosetting resins and includes curing agents and/or curing assistants, or cross-linking agents and/or cross-linking assistants, initiators or the like. In the mixing method b), the curing assistants and other conventional assistants can be added during premixing or in the second mixing step.

In the method according to the present invention, rubber particles preferably have an average particle size of 30 to 200 nm, more preferably 50 to 150 nm. These rubber particles are preferably of a homogeneous structure and have a gel content of 75 percent by weight or more, preferably 85 percent by weight or more.

Thermosetting resins useful for preparing toughened thermosetting resins according to the present invention include epoxy resins, unsaturated polyester resins, phenolic resins, amino resins, alkyd resins, silicone resins or the like, preferably epoxy resins, unsaturated polyester resins or phenolic resins.

The rubber particles useful in the present method can be fully vulcanized powdery rubbers prepared as described in International Application WO01/40356(corresponding to U.S. Pat. No. 6,423,760) filed by the present applicants on Sep. 18, 2000 and Chinese Patent Application No. 00109217.0 filed by the present applicants on Jun. 15, 2000, both of them are cited herein by way of reference. The fully vulcanized powdery rubbers are at least one selected from fully vulcanized powdery natural rubber, fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery polybutadiene rubber, fully vulcanized powdery chloroprene rubber, fully vulcanized powdery silicone rubber, fully vulcanized powdery acrylic rubber, fully vulcanized powdery butadiene-styrene-vinylpyridine rubber, fully vulcanized powdery isoprene rubber, fully vulcanized powdery butyl rubber, fully vulcanized powdery ethylene-propylene rubber, fully vulcanized powdery polysulfide rubber, fully vulcanized powdery acrylate-butadiene rubber, fully vulcanized powdery urethane rubber or fully vulcanized powdery fluorine rubber. Fully vulcanized powdery rubbers mean fine rubber powders which have a gel content of 60 percent by weight or more, preferably 75 percent by weight or more and are freely flowing after drying without any partitioning agents. Such powdery rubbers are obtained by irradiating rubber latexes to cross-link them and fix the particle size of rubber particles. Such fully vulcanized powdery rubbers can be easily mixed with various thermosetting resins.

In the method according to the present invention, the temperature for mixing thermosetting resin prepolymers, conditions for curing (or cross-linking), including temperature, time, curing assistants and the like, and apparatuses employed are those conventionally used for processing and curing (or cross-linking) thermosetting resins. The curing assistants and the amounts thereof are also those conventionally used for thermosetting resins. In addition, it is possible to add assistants conventionally used for processing thermosetting resins, such as curing assistants, cross-linking initiators or the like in suitable amounts, as desired. Depending on the type of thermosetting resins, the conditions for processing, curing (cross-linking) and the like can be altered. For example, in the case of epoxy resins, normally curing agents and other components are firstly mixed with epoxy resin prepolymers uniformly, generally by means of conventional apparatuses such as a three-roll mill, a stirrer, a kneader, a single-screw extruder, a two-screw extruder, a two-roll mill, an internal mixer or the like. Mixing can be carried out at a room temperature. The resulting mixture is degassed and then is poured into a preheated mould to cure at a certain temperature for a period of time to form cured epoxy resins. Conventional curing agents can be selected from polyamines (diethylenetriamine (DETA), diamino diphenyl sulfone (DDS), dicyanodiamide (DICY) or the like), anhydrides (phthalic anhydride (PA), methyl tetrahydrophthalic anhydride (MeTHPA) or the like), polyamides and other polymers. In addition, it is also possible to add curing accelerators such as triethanolamine or the like. In the case of unsaturated polyester resins, their prepolymers per se have contained polymerizable monomers, for example olefinic monomers, such as styrene or the like, and thus only addition of cross-linking initiators such as organic peroxides is sufficient. After uniformly mixing cross-linking initiators and other components with unsaturated polyester resin prepolymers, the resulting mixture is not degassed and is directly poured into a preheated mould to cure at a certain temperature for a period of time. To sum up, the thermosetting resins involved in the method according to the present invention can be processed and cured in a manner conventionally employed in the prior art.

The toughened thermosetting resins according to the present invention comprise rubber phases having a small, uniform and stable particle size, which results in a very significant toughening effect, especially when crazes rapidly grow (as in a standard Izod impact test). The toughened thermosetting resins according to the present invention are excellent in impact resistance, strength, modulus and heat resistance, and when appropriately toughened, the thermosetting resins can be enhanced in terms of impact strength, glass transition temperature and heat distortion temperature. The toughened thermosetting resins according to the present invention are useful for many application areas and the method for preparing the same can be carried out in a simple, easy and cost-effective manner compared to the prior art and is suitable for toughening various thermosetting resins.

EXAMPLES

The present invention is further described with reference to the following examples, which shall not be construed as limiting the present invention in any way. Unless otherwise indicated, the parts in the following examples are by weight.

Example 1

Preparation of Masterbatch 20 parts of a fully vulcanized powdery carboxylated nitrile rubber (prepared by adding trimethylolpropane triacrylate as the cross-linking assistant into the carboxylated nitrile latex (available from Synthetic Resin Plant of Lanzhou Petrochemical Company, Gansu Province, China) in an amount of 3 percent by weight based on the dry weight of the carboxylated nitrile latex, irradiating the resulting mixture in a dosage of 2.5 Mrad to cure it, and then spray drying; gel content: 96.1 percent by weight, average particle size: about 90 nm) is mixed with 100 parts of epoxy resin prepolymers (available from Wuxi Resins Plant, Jiangsu Province, China; Brand: E-44) and the resulting mixture is then milled three times via a three-roll mill to obtain a masterbatch of the fully vulcanized powdery carboxylated nitrile rubber and epoxy resin prepolymers (NMRT-1).

Preparation of Toughened Thermosetting Resins 24 grams of epoxy resin prepolymers (same as above), 43.2 grams of the masterbatch NMRT-1 and 45 grams of methyl tetrahydrophthalic anhydride (available from Jiaxing-Dongfang Chemical Factory, Zhejiang Province, China) are placed in a three-necked flask and then mixed under heating in a thermostatic water bath at 90° C. while stirring for 30 minutes. To the resulting mixture is added 0.9 gram of triethanolamine (available from Jiamusi Petrochemical Factory, Heilongjiang Province, China) and the mixture is degassed while stirring for 5 minutes. The resulting mixture is then cast into a polytetrafluoroethylene mould preheated to a temperature of 130° C., precured at 130° C. for 1 hour, cooled, demoulded and then postcured at 110° C. for 16 hours to obtain articles. The articles are measured in terms of various properties and the results are summarized in table 1. The transmission electron micrograph of the sample is shown in FIG. 1, in which the shadow stands for rubber particles dispersed in thermosetting resin matrix in an average particle size of about 90 nm.

Example 2

The procedure is same as in Example 1 except that epoxy resin prepolymers and NMRT-1 are used in amounts of 48 grams and 14.4 grams, respectively. The results are summarized in table 1.

Example 3

The procedure is same as in Example 1 except that epoxy resin prepolymers and NMRT-1 are used in amounts of 36 grams and 28.8 grams, respectively. The results are summarized in table 1.

Example 4

The procedure is as in Example 1 except that epoxy resin prepolymers and NMRT-1 are used in amounts of 12 grams and 57.6 grams, respectively. The results are summarized in table 1.

Example 5

The procedure is as in Example 1 except that in the preparation of toughened thermosetting resins, no epoxy resin prepolymers are added and only 72 grams of masterbatch NMRT-1 are used. The results are summarized in table 1.

Example 6

Preparation of Masterbatch 10 parts of fully vulcanized powdery carboxylated nitrile rubber (same as in Example 1) and 100 parts of epoxy resin prepolymers (same as in Example 1) are mixed and the resulting mixture is then milled five times via a three-roll mill to obtain a masterbatch of the fully vulcanized powdery carboxylated nitrile rubber and epoxy resin prepolymers (NMRT-2).

Preparation of Toughened Thermosetting Resins 66 grams of NMRT-2 and 45 grams of methyl tetrahydrophthalic anhydride (same as in Example 1) are placed in a three-necked flask and then mixed under heating in a thermostatic water bath at 90° C. while stirring for 30 minutes. To the resulting mixture is added 0.3 gram triethanolamine (same as in Example 1), and the mixture is degassed while stirring for 5 minutes. The resulting mixture is then cast into a polytetrafluoroethylene mould preheated to a temperature of 130° C., precured at 130° C. for 1 hour, cooled, demoulded and then postcured at 110° C. for 16 hours to obtain articles. The articles are measured in terms of various properties and the results are summarized in table 1.

Example 7

The procedure is as in Example 1 except that instead of the fully vulcanized powdery carboxylated nitrile rubber, a fully vulcanized powdery nitrile rubber (prepared by adding trimethylolpropane triacrylate as the cross-linking assistant into the nitrile latex (available from Research and Development Center of Lanzhou Petrochemical Company, Gansu Province, China; Brand: DINGJING-26) in a amount of 3 percent by weight based on the dry weight of the nitrile latex, irradiating the resulting mixture in a dosage of 2.5 Mrad to cure it, and then spray drying; gel content: 85.3 percent by weight, average particle size: about 100 nm) is used. The results are summarized in table 1.

Comparative Example 1

60 grams of epoxy resin prepolymers (same as in Example 1) and 45 grams of methyl tetrahydrophthalic anhydride (same as in Example 1) are placed in a three-necked flask and then mixed under heating in a thermostatic water bath at 90° C. while stirring for 30 minutes. To the resulting mixture is added 0.9 gram of triethanolamine (same as in Example 1) and the mixture is degassed while stirring for 5 minutes. The resulting mixture is then cast into a polytetrafluoroethylene mould preheated to a temperature of 130° C., precured at 130° C. for 1 hour, cooled, demoulded and then postcured at 110° C. for 16 hours to obtain articles. The articles are measured in terms of various properties and the results are summarized in table 1.

Comparative Example 2

60 grams of epoxy resin prepolymers (same as in Example 1), 7.2 grams of CTBN (available from Research Institute of Lanzhou Petrochemical Company, Gansu Province, China; Brand: CTBN-2-16) and 45 grams of methyl tetrahydrophthalic anhydride (same as in Example 1) are placed in a three-necked flask and then mixed under heating in a thermostatic water bath at 90° C. while stirring for 30 minutes. To the resulting mixture is added 0.9 gram of triethanolamine (same as in Example 1) and the mixture is degassed while stirring for 5 minutes. The resulting mixture is then cast into a polytetrafluoroethylene mould preheated to a temperature of 130° C., precured at 130° C. for 1 hour, cooled, demoulded and then postcured at 110° C. for 16 hours to obtain articles. The articles are measured in terms of various properties and the results are summarized in table 1.

Comparative Example 3

The procedure is as in Comparative Example 2 except that CTBN is used in an amount of 28.8 grams. The results are summarized in table 1.

Example 8

Preparation of Masterbatch 10 parts of a fully vulcanized powdery carboxylated nitrile rubber (prepared by adding trimethylolpropane triacrylate as the cross-linking assistant into the carboxylated nitrile latex (available from Synthetic Resin Plant of Lanzhou Petrochemical Company, Gansu Province, China) in a amount of 3 percent by weight based on the dry weight of the carboxylated nitrile latex, irradiating the resulting mixture in a dosage of 2.5 Mrad to cure it, and then spray drying; gel content: 96.1 percent by weight, average particle size: 90 nm) are mixed with 100 parts of unsaturated polyester resin prepolymers (available from Beijing Research and Design Institute of Glass Fiber Reinforced Materials; Brand: UP-191) and the resulting mixture is then milled three times via a three-roll mill to obtain a masterbatch of unsaturated polyester resin prepolymers and the fully vulcanized powdery carboxylated nitrile rubber (NUPT-1).

Preparation of Toughened Thermosetting Resins 60 grams of unsaturated polyester resin prepolymers (same as above), 66 grams of the masterbatch NUPT-1 and 3 grams of a 50% solution of methyl ethyl ketone peroxide (available from Beijing Research and Design Institute of Glass Fiber Reinforced Materials) in dimethyl phthalate are placed in a three-necked flask and then mixed under heating in a thermostatic water bath at 60° C. while stirring for 30 minutes. The resulting mixture is then cast into a polytetrafluoroethylene mould preheated to a temperature of 90° C., cured at 90° C. for 2 hours, cooled and demoulded to obtain articles. The articles are measured in terms of various properties and the results are summarized in table 2.

Comparative Example 4

120 grams of unsaturated polyester resin prepolymers (manufactured by Beijing Research and Design Institute of Glass Fiber Reinforced Materials, Brand: UP-191) and 3 grams of a 50% solution of methyl ethyl ketone peroxide (manufactured by Beijing Research and Design Institute of Glass Fiber Reinforced Materials) in dimethyl phthalate are placed in a three-necked flask and then mixed under heating in a thermostatic water bath at 60° C. while stirring for 30 minutes. The resulting mixture is then cast into a polytetrafluoroethylene mould preheated to a temperature of 90° C., cured at 90° C. for 2 hours, cooled and demoulded to obtain articles. The articles are measured in terms of various properties and the results are summarized in table 2.

TABLE 1

| Item Unit | Weight ratio of rubber to resin — | Izod impact strength kJ/m$^2$ | Flexural strength MPa | Flexural modulus GPa | Glass transition temperature* ° C. | Thermal distortion temperature ° C. |
|---|---|---|---|---|---|---|
| Ex. 1 | 12:100 | 22.3 | 81.4 | 2.76 | 114.2(DSC) | 114.4 |
| Ex. 2 | 4:100 | 14.3 | 97.9 | 2.90 | 113.2(DSC) | 112.4 |
| Ex. 3 | 8:100 | 17.1 | 88.1 | 2.71 | 110.6(DSC) | 111.6 |
| Ex. 4 | 16:100 | 19.4 | 81.9 | 2.43 | 111.4(DSC) | 114.3 |
| Ex. 5 | 20:100 | 25.4 | 76.5 | 2.43 | 109.6(DSC) | 114.9 |
| Ex. 6 | 10:100 | 18.3 | 87.7 | 2.76 | 105.1(DSC) | 110.0 |
| Ex. 7 | 12:100 | 16.1 | 77.6 | 2.52 | 114.4(DSC) | 108.3 |
| Comp. Ex. 1 | 0:100 | 11.4 | 102 | 3.18 | 108.9(DSC) | 113.2 |
| Comp. Ex. 2 | 12:100 | 15.9 | 86.6 | 2.66 | 107.0(DSC) | 107.6 |
| Comp. Ex. 3 | 48:100 | 16.2 | 23.0 | 1.07 | −9.6(DMA) | 91.6 |
| Test Standard | — | GB1843-96 | GB9341-88 | GB9341-88 | — | GB1634-79 |

*The glass transition temperature of epoxy resin phase

TABLE 2

| Item Unit | Weight ratio of rubber to resin — | Izod impact strength kJ/m$^2$ | Flexural strength MPa | Flexural modulus GPa | Glass transition temperature* (DSC)° C. | Thermal distortion temperature ° C. |
|---|---|---|---|---|---|---|
| Ex. 8 | 5:100 | 3.6 | 76.4 | 2.51 | 41.0 | 75.0 |
| Comp. Ex. 4 | 0:100 | 2.8 | 84.6 | 2.92 | 38.3 | 70.8 |
| Test Standard | — | GB1843-96 | GB9341-88 | GB9341-88 | — | GB1634-79 |

*The glass transition temperature of unsaturated polyester resin phase

What is claimed is:

1. A toughened thermosetting resin, consisting of: a thermosetting resin and fully vulcanized powdery carboxylated nitrile rubber particles dispersed therein in an average particle size in the range of 30 to 200 nm and having a homogeneous structure and a gel content of 75 percent by weight or more, wherein said rubber particles are fully vulcanized powdery rubbers prepared by a process comprising providing a rubber latex, optionally adding a cross-linking agent into the rubber latex, then applying irradiation to the rubber latex to form a cross-linked rubber latex and then drying the cross-linked rubber latex, and wherein said ratio of the total weight of said rubber particles to the total weight of said thermosetting resins is about 1:100 to about 30:100, wherein the Izod impact strength of the toughened thermosetting resin is increased in comparison with the thermosetting resin without said rubber particles, wherein said thermosetting resin is epoxy resins, and wherein a thermal distortion temperature of said toughened thermosetting resin is decreased 4.33% or less, or is increased, in comparison with a thermosetting resin without said rubber particles.

2. The toughened thermosetting resin as claimed in claim 1, wherein said rubber particles have an average particle size in the range of 50 to 150nm.

3. A thermosetting resin, comprising:
a thermosetting resin selected from the group consisting of an epoxy resin, an unsaturated polyester resin, a phenolic resin, an amino resin, and a silicone resin;
a fully vulcanized powdery carboxylated nitrile rubber particle having an average particle size in the range of 30 to 200 nm and dispersed within the thermosetting resin;
wherein the thermosetting resin has a homogeneous structure and a gel content of 75 percent by weight or more, and wherein a ratio of total weight of said rubber particle to total weight of said thermosetting resin is about (1.0-30.0):100; and
wherein a thermal distortion temperature of said toughened thermosetting resin is decreased 4.33% or less, or is increased, in comparison with a thermosetting resin without said rubber particles.

4. The toughened thermosetting resin in claim 1, wherein said ratio of the total weight of said rubber particles to the total weight of said thermosetting resin is about 4:100 to about 30:100.

5. The thermosetting resin in claim 3, wherein said ratio of total weight of said rubber particle to total weight of said thermosetting resin is about (4.0-30.0):100.

* * * * *